(12) United States Patent
Harrison

(10) Patent No.: US 9,859,814 B2
(45) Date of Patent: Jan. 2, 2018

(54) METHOD AND APPARATUS FOR INDEPENDENT CONTROL OF MULTIPLE POWER CONVERTER SOURCES

(71) Applicant: Enphase Energy, Inc., Petaluma, CA (US)

(72) Inventor: Michael J. Harrison, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 531 days.

(21) Appl. No.: 14/505,299

(22) Filed: Oct. 2, 2014

(65) Prior Publication Data

US 2015/0097434 A1    Apr. 9, 2015

Related U.S. Application Data

(60) Provisional application No. 61/886,375, filed on Oct. 3, 2013.

(51) Int. Cl.
*H02M 7/44* (2006.01)
*H02J 3/38* (2006.01)
(Continued)

(52) U.S. Cl.
CPC .............. *H02M 7/44* (2013.01); *H02J 3/383* (2013.01); *H02M 3/33592* (2013.01);
(Continued)

(58) Field of Classification Search
CPC .. H02M 7/44; H02M 7/4807; H02M 3/33592; H02M 2007/4815; H02M 7/49;
(Continued)

(56) References Cited

U.S. PATENT DOCUMENTS 6,198,178 B1    3/2001  Schienbein et al.
7,009,859 B2    3/2006  Chen et al.
(Continued)

FOREIGN PATENT DOCUMENTS

JP    2011039876 A    2/2011
JP    2011096968 A    5/2011
(Continued)

OTHER PUBLICATIONS

Yu et al., "A Multiple-Input Current-Source Converter for a Stand-Alone Hybrid Power System", Applied Power Electronics Conference and Exposition (APEC), 2011 , Twenty-Sixth Annual IEEE, Conference dates Mar. 6-11, 2011, pp. 35-40, Conference held in Fort Worth, TX.

(Continued)

*Primary Examiner* — Jared Fureman
*Assistant Examiner* — Rafael Pacheco
(74) *Attorney, Agent, or Firm* — Moser Taboada

(57) ABSTRACT

A method and apparatus for independently controlling multiple power converter sources. In one embodiment, the method comprises determining a ratio of a first set point for biasing a first DC source to a power converter and a second set point for biasing a second DC source to the power converter, wherein the first and the second DC sources are serially-coupled to one another and coupled to an input bridge of the power converter by a filter; and determining, based on the ratio, relative switching times for driving a first diagonal of an input bridge of the power converter and a second diagonal of the input bridge to bias the first DC source proximate the first set point and the second DC source proximate the second set point.

20 Claims, 7 Drawing Sheets

(51) Int. Cl.
*H02M 3/335* (2006.01)
*H02M 7/48* (2007.01)

(52) U.S. Cl.
CPC .. *H02M 7/4807* (2013.01); *H02M 2007/4815* (2013.01); *Y02B 70/1441* (2013.01); *Y02E 10/563* (2013.01); *Y10T 307/50* (2015.04)

(58) Field of Classification Search
CPC .... H02J 3/383; Y02E 10/563; Y02B 70/1441; Y10T 307/50
See application file for complete search history.

(56) References Cited

U.S. PATENT DOCUMENTS

| | | | |
|---|---|---|---|
| 8,212,409 | B2 | 7/2012 | Bettenwort et al. |
| 8,526,205 | B2 | 9/2013 | Garrity |
| 8,638,581 | B2 | 1/2014 | Zacharias et al. |
| 2008/0150366 | A1* | 6/2008 | Adest ............... H02J 3/383 307/77 |
| 2012/0104863 | A1 | 5/2012 | Yuan |
| 2012/0112550 | A1 | 5/2012 | Schill |
| 2012/0170341 | A1* | 7/2012 | Fornage ............ H02M 7/5387 363/132 |
| 2012/0313443 | A1 | 12/2012 | Cheng et al. |
| 2013/0002031 | A1 | 1/2013 | Mulkey et al. |
| 2013/0043733 | A1 | 2/2013 | Frolov et al. |
| 2014/0140221 | A1 | 5/2014 | Manam et al. |

FOREIGN PATENT DOCUMENTS

| | | |
|---|---|---|
| JP | 2013152675 A | 8/2013 |
| KR | 20080030129 A | 4/2008 |

OTHER PUBLICATIONS

Zhao et al., "Technological Assessment of DC-DC Multiple-Input Converters as an Interface for Renewable Energy Applications", Renewable Energy Research and Applications (ICRERA), 2012 International Conference on Nov. 11-14, 2012, pp. 1-6, Conference held in Nagasaki.

Shen et al., "Multi-Input Converter with MPPT Feature for Wind-PV Power Generation System", International Journal of Photoenergy, Article ID 129254, Jan. 2013, vol. 2013, pp. 13, Hindawi Publishing Corporation.

Sivakumar et al., "Control of Hybrid System Using Multi-Input Inverter and Maximum Power Point Tracking", International Journal of Engineering Research and Applications, Jul.-Aug. 2013, vol. 3, Issue 4, pp. 77-81.

PCT Search Report and Written Opinion for PCT/US2014/058882, 11 pages, dated Jan. 8, 2015.

Kwasinski, "DC/DC Multiple-Input Power Converters for Renewable Energy Applications", The University of Texas at Austin Office of Technology Commercialization, pp. 1.

* cited by examiner ns the claims.
METHOD AND APPARATUS FOR INDEPENDENT CONTROL OF MULTIPLE POWER CONVERTER SOURCES

CROSS-REFERENCE TO RELATED APPLICATION

This application claims priority to U.S. Provisional Patent Application No. 61/886,375 filed on Oct. 3, 2013, which is herein incorporated in its entirety by reference.

BACKGROUND OF THE INVENTION

Field of the Invention

Embodiments of the present disclosure relate generally to power conversion, and, in particular, to independently controlling multiple sources to a power converter.

Description of the Related Art

Resonant converters provide many advantages over other types of power converters. Such advantages may include low noise, low component stress, low component count, and predictable conduction-dominated losses. Resonant converters may therefore be smaller, less costly, and more efficient devices that other types of converters.

Converters are often used in power generation for distributed generators such as photovoltaic (PV) panels or modules that produce DC voltage. The PV modules are conventionally connected in series and generate power at varying rates depending on operating factors such as the environment. A Maximum Power Point Tracking (MPPT) algorithm implemented with respect to the pair of PV modules will find the optimum operational point of the combined series string in order to extract the maximum power from the series string of PV modules. Such MPPT however suffers in terms of efficiency when compared to MPPT performed at a per-module granularity.

Therefore, there is a need in the art for a method and apparatus for independently controlling multiple sources to a power converter.

SUMMARY OF THE INVENTION

Embodiments of the present invention generally relate to a method and apparatus for independently controlling multiple power converter sources substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method and apparatus for a three-port (i.e., multi-input) converter having two separate DC input connections and a single output connection, such as an AC connection. In some embodiments of the present invention, the three-port converter is a DC-AC converter having two separate and distinct DC sources (e.g., photovoltaic PV modules) coupled to respective individual DC half-bridge circuits that are decoupled from one another at one terminal, thereby allowing each DC source to be independently biased. In other embodiments, the converter may have two serially-coupled DC sources coupled to its input, where the serially-coupled DC sources may be independently biased as described herein. In still other embodiments, the converter may have four DC sources coupled to its input where the four DC sources may be independently biased.

In embodiments where the DC sources may be operated at maximum power points (MPPs), e.g., where the DC sources are PV modules, the output from each DC source has individual maximum power point tracking (MPPT) allowing for independent MPPT control. MPPT algorithms may be independently executed (e.g., by a controller of the three-port converter) and advantageously, the individual DC sources can each be operated at their own individual MPP optima.

In some other embodiments, the three-port converter may be an AC-DC converter where an AC input power is converted from a single AC input to two separate DC outputs.

Figure 1:
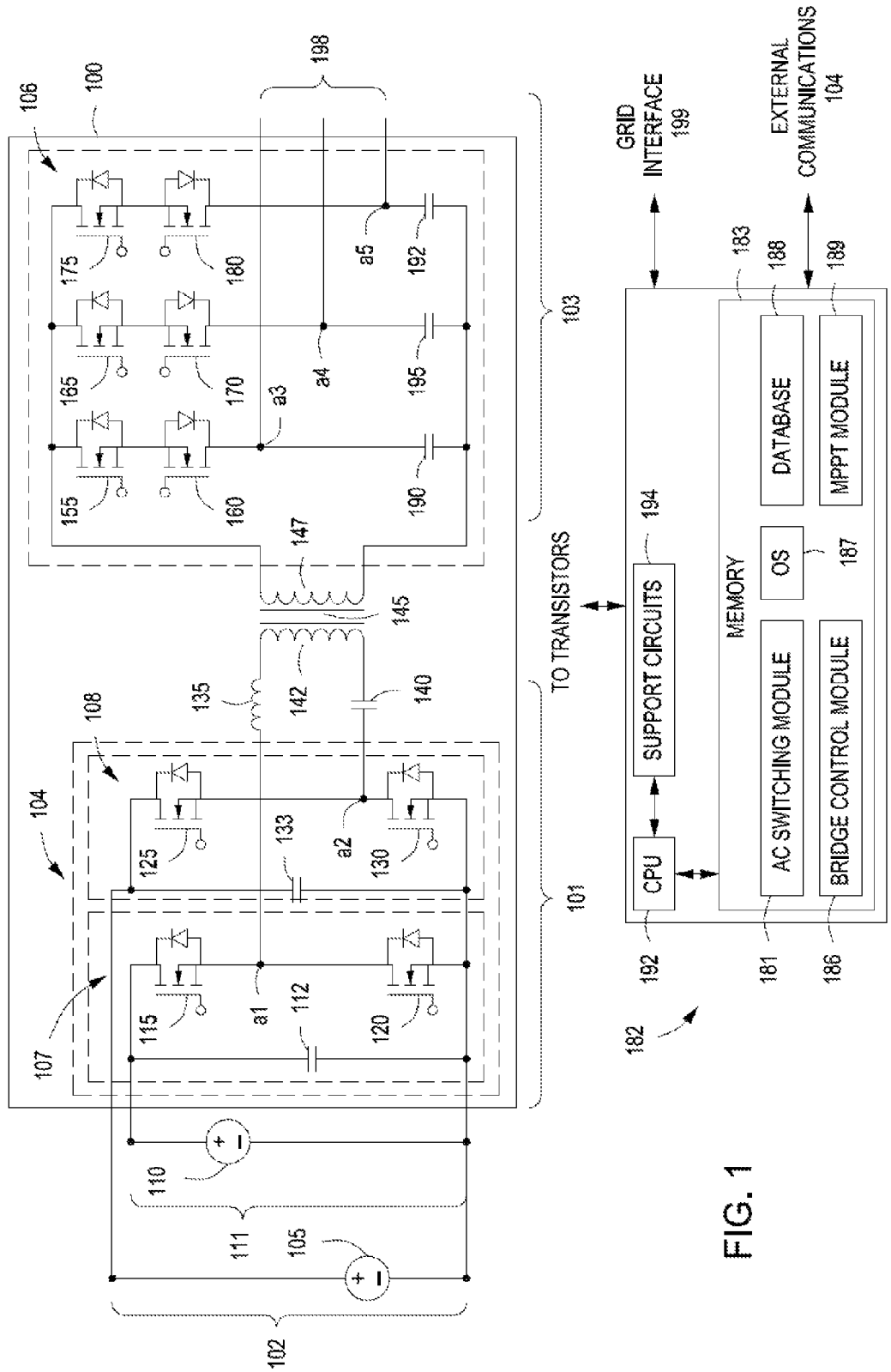
FIG. 1 is a schematic diagram of a resonant converter in accordance with one or more embodiments of the present invention.

FIG. 1 is a schematic diagram of a resonant converter 100 in accordance with one or more embodiments of the present invention. This diagram portrays one variation of a myriad of possible system configurations. The present embodiment can function in a variety of power generation environments and systems. The resonant converter (hereinafter "converter") 100 is operated by the controller 182. The converter 100 is described as outputting a multi-phase AC output, however, alternative embodiments include single phase operation and output, split-phase (e.g., two phase) output, DC-DC power conversion, or AC-DC power conversion.

Switches described herein may be n-type metal-oxide-semiconductor field-effect transistors (MOSFETs) or, alternatively, any other suitable electronic switch, such as insulated gate bipolar transistors (IGBTs), bipolar junction transistors (BJTs), p-type MOSFETs, gate turnoff thyristors (GTOs), and the like. Switches disclosed herein are depicted as transistors (i.e., FETs) with diodes connected across the source and drain. While the diodes represent an intrinsic property of the transistors, further embodiments may place an actual diode at their location.

The converter 100 comprises input ports 111 and 102, bridge circuit 104, an inductor 135, a resonant circuit comprising capacitor 140 and inductor 135, an isolation transformer 145, AC switching circuit 106, and an output port 198. The converter 100 comprises a DC-side 101 (i.e., on the primary side of the transformer 145) and an AC-side 103 (i.e., on the secondary side of the transformer 145). The DC-side 101 includes circuitry for the conversion of received DC power from the input ports 111 and 102. The AC-side 103 includes circuitry for the conversion of power from the DC-side into AC power for the output port 198. The output port 198 is coupled to an AC line; in some embodiments, the output port 198 couples power to a commercial power grid.

A first PV module 105 and a second PV module 110 are coupled across ports 102 and 111, respectively. The first PV module 105 and the second PV module 110 are represented in FIG. 1 by voltage sources outputting a DC power (e.g., a 60 cell PV panel). In alternative embodiments, the first PV module 105 and the second PV module 110 are other types of DC sources, such as other types of renewable energy sources (e.g., a wind turbine, hydroelectric system, and the like), batteries, or the like.

The bridge circuit 104 is coupled between the input ports 111/102 and a series combination of the inductor 135, the primary winding of the isolation transformer 145, and the capacitor 140. The bridge circuit 104 outputs a high frequency waveform (e.g., a 100 kilohertz (KHz) square wave) that passes through the inductor 135 and resonant capacitor 140 to output a substantially sinusoidal current waveform to the isolation transformer 145.

The bridge circuit 104 comprises a first half-bridge circuit 107 and a second half-bridge circuit 108. The first half-bridge circuit 107 comprises an input capacitor 112, switch 115, and switch 120. The input capacitor 112 receives DC power from the input port 111 and is coupled in parallel with the PV module 110. The input capacitor 112 is also coupled across a series combination of switches 115 and 120, hereinafter referred to as a "switch pair" 115/120. Node a1 is located between the switch pair 115/120 for outputting half-wave inverted power (e.g., a 100 KHz square wave) from the second PV module 110. Node a1 is coupled to a first terminal of the inductor 135, and the second terminal of the inductor 135 is coupled to a first terminal of the primary winding 142 of the isolation transformer 145.

The second half-bridge circuit 108 comprises an input capacitor 133, switch 125, and switch 130. The input capacitor 133 receives DC power from the input port 102 and is coupled in parallel with the PV module 105. The input capacitor 133 is also coupled across a series combination of switches 115 and 120, hereinafter referred to as a "switch pair" 125/130. Node a2 is located between the switch pair 125/130 for outputting half-wave inverted power (e.g., a 100 KHz square wave) from the PV module 105. Node a2 is coupled to a first terminal of the resonant capacitor 140. A second terminal of the resonant capacitor 140 is coupled to a second terminal of the primary winding 142 of the isolation transformer 145.

In some alternative embodiments, the inductor 135 may represent a leakage inductance of the isolation transformer 145 rather than being a separate inductor, thereby reducing the overall component count of the converter 100. In other alternative embodiments, other types of resonant circuits (e.g., series LC, parallel LC, series-parallel LLC, series-parallel LCC, series-parallel LLCC, and the like) may be utilized within the resonant converter 100.

The isolation transformer 145 comprises the primary winding 142 and a secondary winding 147. The isolation transformer 145 couples power from the DC-side 101 to the AC-side 103. The primary winding 142 is coupled to a terminal of the inductor 135 on one leg and a terminal of the capacitor 140 on the other leg such as to couple power from the bridge circuit 104. The secondary winding 142 is coupled across an input of the AC-switching circuit 106. The isolation transformer 145 may be a step-up or step-down transformer for respectively increasing or decreasing the magnitude of the voltage output from the bridge circuit 104.

The AC-switching circuit 106 operates as a three phase cycloconverter. The AC-switching circuit 106 comprises switches 155, 160, 165, 170, 175, and 180; and capacitors 190, 195, and 192. Switches 155 and 160 are coupled in series combination to form a switch pair 155/160 that is coupled in series to the capacitor 190. A node a3 is located between the switch pair 155/160 and the capacitor 190 forming a first leg of the output port 198. Switches 165 and 170 are coupled in series combination to form a switch pair 165/170 that is coupled in series to the capacitor 195. A node a4 is located between the switch pair 165/170 and the capacitor 195 forming a second leg of the output port 198. Switches 175 and 180 are coupled in series combination to form a switch pair 175/180 that is coupled in series to the capacitor 192. A node a5 is located between the switch pair 175/180 and the capacitor 192 forming a third leg of the output port 198. Each leg outputs an AC power of a different phase offset to form a three phase output power. In alternative embodiments, the AC-switching circuit 106 may be a single-phase cycloconverter for generating single-phase output; in still other embodiments, the AC switching circuit 106 may generate two phases (e.g., split phase output).

The converter 100 further comprises a controller 182. Gate terminals and source terminals of each of the switches (115, 120, 125, 130, 155, 160, 165, 170, 175, 180) are coupled to the controller 182 for operatively controlling the switches.

As a result of the topology of the half-bridges 107 and 108, the PV modules 105 and 110 may be individually biased to different operating voltages for independent MPPT at the individual "per-panel" level. The controller 182 alternately activates and deactivates switch pairs 115/130 and 120/125 at substantially 180 degrees out of phase to supply power to the AC-switching circuit 106. The switch pairs 115/130 and 120/125 are respective diagonals of the H-bridge configuration. The switching frequency in some embodiments is on the order of 100 KHz. The amount of power from each of the PV modules 105 and 110 may be apportioned by setting the balance of the duty cycles between the switch pairs 115/130 and 120/125 (for example, the ratio of duty cycles may be set to 49/51 in order to draw more power from a PV module than the other).

In some embodiments, power conversion parameters (e.g., duty cycle allocation) are predetermined for various combinations of operating parameters. For example, for given values of power and voltage received from each PV module, the AC line RMS voltage, and the AC line instantaneous voltage, predetermined converter operating parameters may be employed. In some such embodiments, a look-up table (LUT) may be used for identifying the converter operating parameters based on a given set of operating conditions During operation, a substantially sinusoidal waveform is output and coupled across the isolation transformer 245. The AC-switching circuit 106 selectively couples the substantially sinusoidal waveform coupled across from the second winding 147 to each node (i.e., a3, a4, and a5) to output a three phase AC power. The capacitors 190, 195, and 192 are selectively charged and discharged by toggling switches 155, 160, 165, 170, 175, and 180 to smooth the respective AC waveforms for each node. Alternative embodiments with a single phase output may have a single-phase cycloconverter substituted for the AC-switching circuit 106.

In some embodiments, separate current and voltage samplers (not shown) at each input port 111 and 102 monitor the respective DC inputs. In addition AC voltage and/or current samplers (not shown) monitor AC voltage on the AC line at the output port 198. In other embodiments, the samplers may include analog to digital converters for sending sampling data to the controller 182.

The controller 182 comprises a CPU 192 coupled to support circuits 194 and memory 183 containing, for example, instructions, data, and algorithms. The controller 182 may be comprised of hardware, software, or a combination thereof. The CPU 192 may comprise one or more conventionally available processors, microprocessors, microcontrollers, and/or combinations thereof configured to execute non-transient software instructions to perform various tasks in accordance with the present invention. The controller 182 may be implemented using a general purpose computer that, when executing particular software, becomes a specific purpose computer for performing various embodiments of the present invention. The CPU 192 processes inputs and outputs to the transistors/switches, external communications 104 (e.g., to a gateway) and an AC line interface 199.

Support circuits 194 are well-known circuits used to promote functionality of the CPU 192. Such circuits include, but are not limited to a cache, power supplies, clock circuits, buses, input/output circuits, and the like. Additionally, the support circuits 194 may include circuitry for sensors (e.g., voltage, current, temperature, photo-detectors and the like) used to determine operating conditions and data. Alternative embodiments may use control algorithms on a custom Application Specific Integrated Circuit (ASIC). In some embodiments, converter control techniques described herein that are executed by the controller 182 may be compatible with Reactive Power Control (RPC) requirements that come from Advanced Grid Functional (AGF) requirements.

The memory 183 may comprise random access memory, read only memory, removable disk memory, flash memory, or various combinations of these. The memory 186 may store various forms of application software, such as a bridge control module 186, operating system (OS) 187, MPPT module 189, AC switching module 181, and a database 188.

The operating system 187 facilitates interaction of the modules in memory 183 on the CPU 192 and support circuits 194. The MPPT module 189 is executed to determine the Maximum Power-Point (MPP) for each of the PV modules 105 and 110. Each PV module 105 and 107 may be independently operated at its corresponding MPP. The bridge control module 186 controls operation of switches 115, 120, 125, and 130 of the bridge circuit 104 as described herein. The bridge control module 186 is executed for operating the bridge switches 115, 120, 125, 130 to bias the PV modules 105 and 110 at desired operating voltages corresponding to respective MPPs as determined by the MPPT module 189. The bridge control module 186 determines operating frequency and duty cycles for the H-bridge diagonals The AC-switching module 181 operates switches 155, 160, 165, 170, 175, and 180 of the AC-switching circuit 106 to output a desired AC power at the output port 198. The database 188 stores data related to operation of the converter 100 as well as data related to the present invention, such as data used to determine operating parameters for the converter 100 based on real-time operating conditions for future recall (e.g., using a LUT).

Some examples for single and three phase conversion may be found in commonly assigned patent application U.S. Pat. App. 2012/0170341 entitled "Method and Apparatus for Resonant Power Conversion" filed Jan. 3, 2012, which is herein incorporated by reference in its entirety. Some examples of the multi-input independent MPPT may be found in commonly assigned patent application U.S. patent application Ser. No. 14/140,221 entitled "Three Port Converter with Dual Independent Maximum Power Point Tracking and Dual Operating Modes" filed Dec. 24, 2013, which is herein incorporated by reference in its entirety.

Figure 2:
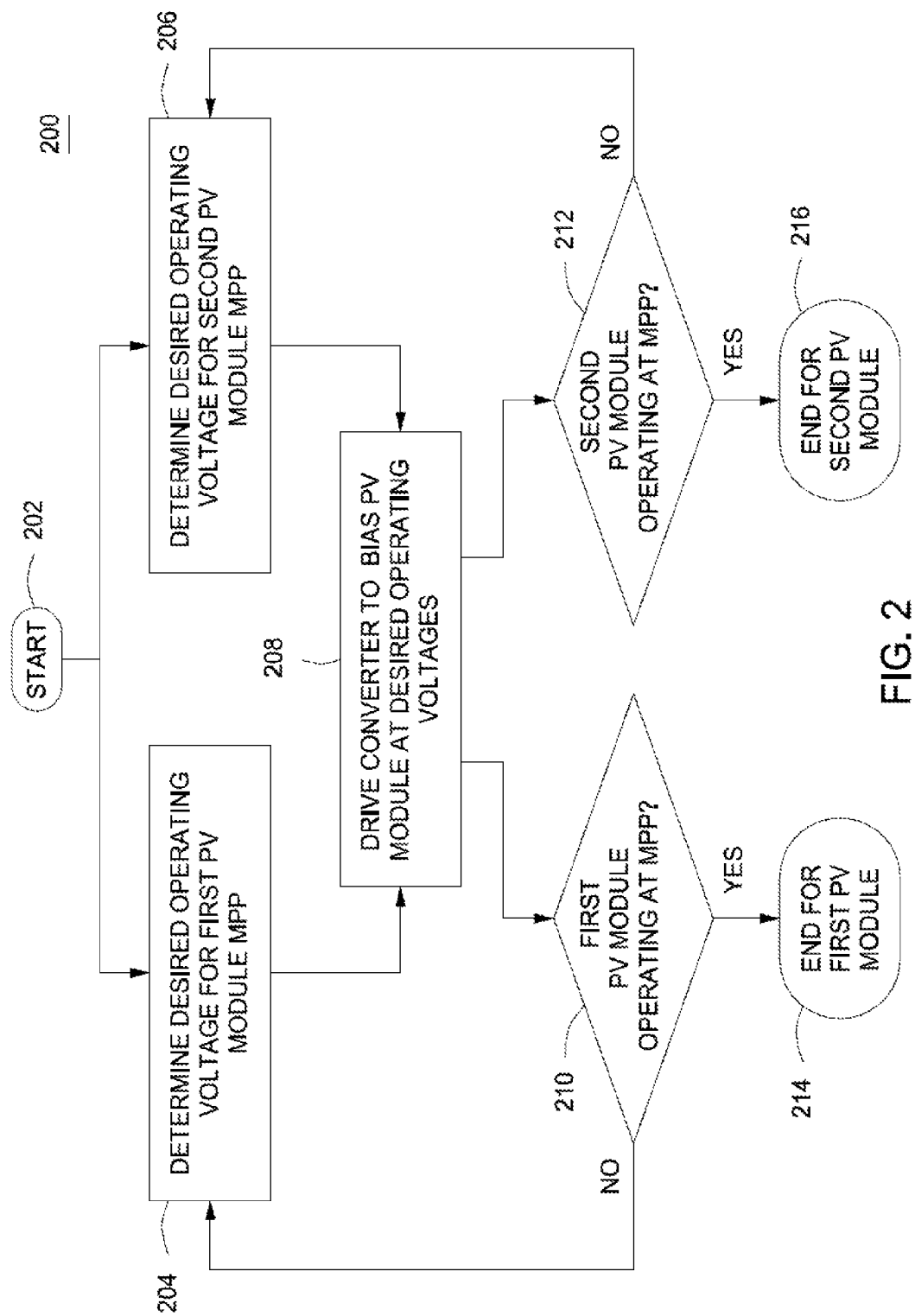
FIG. 2 is a flow diagram of a method or independent maximum power point tracking (MPPT) for a three-port (i.e., dual input) converter in accordance with one or more embodiments of the present invention.

FIG. 2 is a flow diagram of a method 200 for independent maximum power point tracking (MPPT) for a three-port (i.e., dual input) converter in accordance with one or more embodiments of the present invention. The three-port converter is a resonant converter with two separate DC sources each coupled to different DC half-bridges by first and second DC input ports of the converter—i.e., a first DC power source is coupled across the first half-bridge circuit and a second DC power source is coupled across the second half-bridge circuit as shown in FIG. 1. Source terminals of the bottom switches of each half-bridge circuit are coupled to one another and to the negative terminals of the DC power sources. In some embodiments of the method 200, such as the embodiment described below, the DC power sources are photovoltaic (PV) modules; in other embodiments, the DC power sources may be any suitable DC power source such as other types of renewable energy sources (e.g., wind turbines, hydroelectric systems, or the like), batteries, or the like. In the embodiment described below, the three-port converter is a DC-AC resonant converter that generates AC output power, such as the resonant converter 100. The method 200 comprises an implementation of the MPPT module 189 of the controller 182. Alternative embodiments include outputting a DC power where the AC switching circuit is replaced with a unipolar bridge circuit (e.g., a half-bridge with two transistors or a full-bridge with four transistors).

The method 200 starts at step 202 and proceeds to steps 204 and 206. At step 204, a desired operating voltage is determined for operating a first of the two PV modules at its maximum power point (MPP). Analogous to step 204, at step 206 a desired operating voltage is determined for operating the second of the two PV modules at its MPP. As a result of being coupled to the different half-bridge circuits of the three-port converter, which are decoupled from one another as previously described, the MPPs for the PV modules may be determined independent from one another and the PV modules may each be operated at voltages completely independent from one another. The different half-bridge circuits are connected but conventionally coupled together such that the input ports 111 and 102 share only one common node.

In one example, if the first PV module suddenly experiences shading while the second PV module does not, changes to the MPP for the first PV module can be determined and the first PV module can be biased, independent of the second PV module's operating voltage, to an operating voltage corresponding to its changed MPP. The steps 204 and 206 may be performed simultaneously or, alternatively, one of the steps may be performed before the other one.

The method 200 proceeds to step 208, where the converter is driven to bias the PV modules at their corresponding desired operating voltages. The method 200 then proceeds to steps 210 and 212. At step 210, a determination is made whether the first PV module is operating at its MPP. If the result of such determination is no, that the first PV module is not operating at its MPP, the method 200 returns to step 204 where its desired operating voltage is adjusted to correspond to its MPP. Any suitable MPPT technique may be employed for determining whether the first PV module is operating at its MPP and any corresponding needed change in operating voltage, such as a "perturb and observe" technique. In some embodiments, the MPPT algorithm is implemented at the mains line frequency and this frequency is the frequency that the first PV module operating voltage is adjusted. If, at step 210, the result of the determination is that the first PV module is operating at its MPP, the method 200 proceeds to step 214 where it ends for the first PV module.

Analogous to step 210, at step 212 a determination is made whether the second PV module is operating at its MPP. If the result of such determination is no, that the second PV module is not operating at its MPP, the method 200 returns to step 204 where its desired operating voltage is adjusted to correspond to its MPP. Any suitable MPPT technique may be employed for determining whether the second PV module is operating at its MPP and any corresponding needed change in operating voltage, such as a "perturb and observe" technique. In some embodiments, the MPPT algorithm is implemented at the mains line frequency and this frequency is the frequency that the second PV module operating voltage is adjusted. If, at step 212, the result of the determination is that the second PV module is operating at its MPP, the method 200 proceeds to step 216 where it ends for the second PV module.

Figure 3:
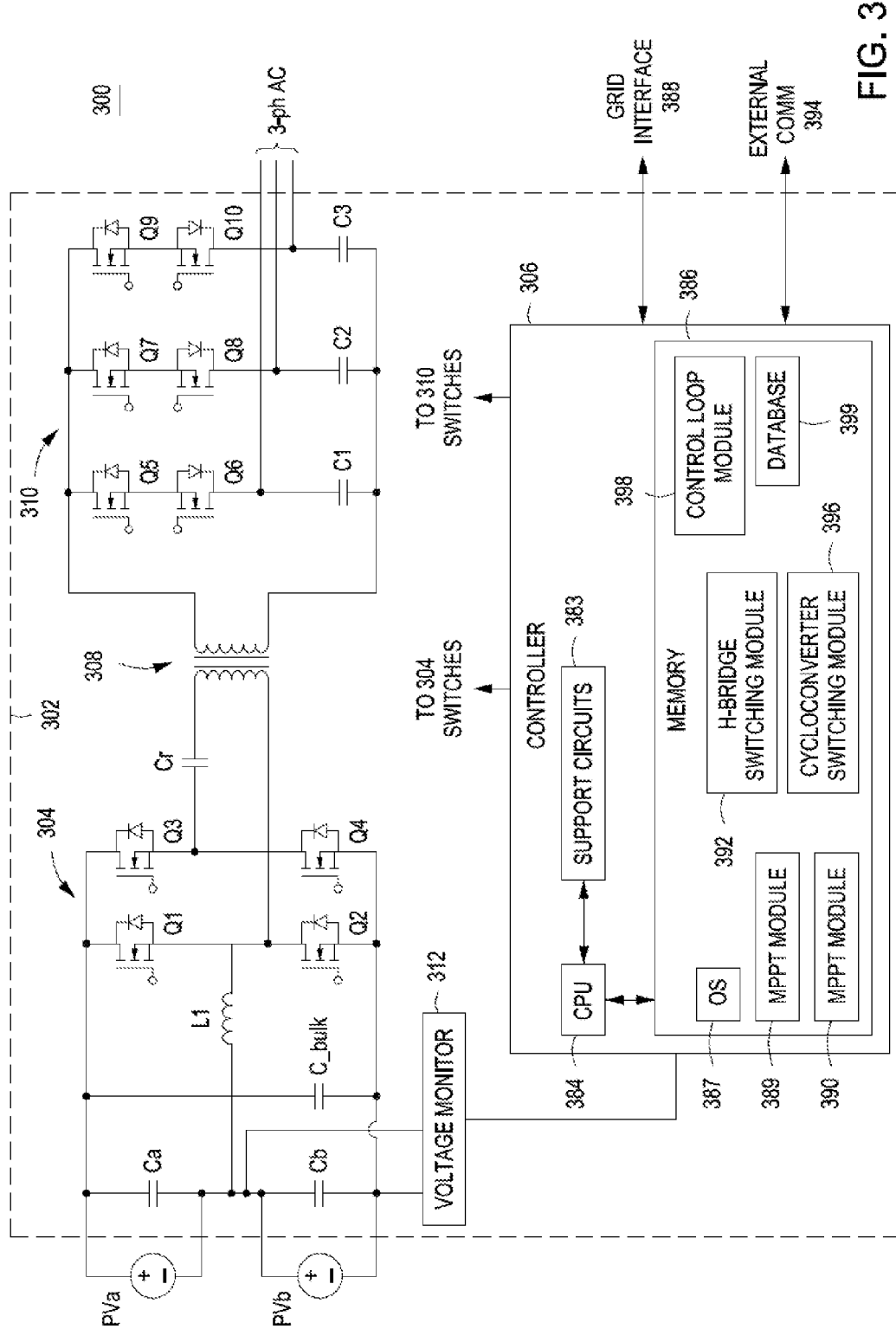
FIG. 3 is a schematic diagram of a power conversion system comprising a dual-input inverter in accordance with one or more embodiments of the present invention.

FIG. 3 is a schematic diagram of a power conversion system 300 comprising a dual-input inverter 302 in accordance with another embodiment of the present invention. This diagram only portrays one variation of the myriad of possible system configurations. The present invention can function in a variety of power generation environments and systems.

The power conversion system 300 comprises photovoltaic (PV) modules PVa and PVb coupled in series and across the dual-input inverter 302 ("inverter 302"). In one or more alternative embodiments other types of DC voltage sources, such as other types of renewable energy sources (e.g., windfarms, hydroelectric systems, and the like), batteries, and the like may be additionally or alternatively be used.

The inverter 302 comprises input capacitors Ca and Cb coupled across the PV modules PVa and PVb, respectively. Although the capacitors Ca and Cb are depicted in FIG. 3 as within the inverter 302, in other embodiments the capacitors Ca and Cb may be coupled across the PV modules PVa and PVb, respectively, external to the inverter 302. For example, the capacitors Ca and Cb may be coupled directly across the PV modules PVa and PVb, respectively, within the corresponding PV module junction boxes. Generally, the capacitors Ca and Cb would each be on the order of tens to hundreds of nanofarads.

The inverter 302 further comprises a voltage monitor 312 coupled across the PV module PVb to measure the voltage at the midpoint of the inverter input. A capacitor C_bulk, for bulk storage, is coupled across the series combination of the capacitors Ca and Cb, as well as across an H-bridge 304 formed from switches Q1, Q2, Q3 and Q4. The switches Q1 and Q2 are coupled in series to form a left leg of the H-bridge 304, and the switches Q3 and Q4 are coupled in series to form a right leg of the H-bridge 304. An inductor L1 is coupled between the midpoint of the PV modules PVa and PVb (i.e., between PVa and PVb) and a midpoint of the H-bridge left leg (i.e., between the switches Q1 and Q2).

The output of the H-bridge 304 is coupled across a series combination of a capacitor Cr and the primary winding of a transformer 308. The secondary winding of the transformer 308 is coupled across a cycloconverter 310 which produces a three-phase AC output, although in other embodiments the cycloconverter 310 may produce one or two phases of AC at its output. The cycloconverter 310 comprises a first leg, a second leg, and a third leg coupled in parallel to one another. The first cycloconverter leg comprises a series combination of a switch Q5, a switch Q6, and a capacitor C1. The second cycloconverter leg comprises a series combination of a switch Q7, a switch Q8, and a capacitor C2. The third cycloconverter leg comprises a series combination of a switch Q9, a switch Q10, and a capacitor C3. A first AC output phase line is coupled between the switch Q6 and the capacitor C1, a second AC output phase line is coupled between the switch Q8 and the capacitor C2, and a third AC output phase line is coupled between the switch Q10 and the capacitor C3. In some embodiments, the inverter 302 may include additional circuitry not shown, such as voltage and/or current monitors, for obtaining data for use as described herein.

The inverter 302 additionally comprises a controller 306 coupled to the voltage monitor 312, the H-bridge switches Q1, Q2, Q3 and Q4, and the cycloconverter switches Q5, Q6, Q7, Q8, Q9, and Q10. The controller 306 comprises a CPU 384 coupled to each of support circuits 383 and a memory 386. The CPU 384 may comprise one or more conventionally available microprocessors or microcontrollers; additionally or alternatively, the CPU 384 may include one or more application specific integrated circuits (ASICs). The support circuits 383 are well known circuits used to promote functionality of the CPU 384. Such circuits include, but are not limited to, a cache, power supplies, clock circuits, buses, input/output (I/O) circuits, and the like. The controller 306 may be implemented using a general purpose computer that, when executing particular software, becomes a specific purpose computer for performing various embodiments of the present invention.

The memory 386 may comprise random access memory, read only memory, removable disk memory, flash memory, and various combinations of these types of memory. The memory 386 is sometimes referred to as main memory and may, in part, be used as cache memory or buffer memory. The memory 386 generally stores the operating system (OS) 387, if necessary, of the controller 306 that can be supported by the CPU capabilities. In some embodiments, the OS 387 may be one of a number of commercially available operating systems such as, but not limited to, LINUX, Real-Time Operating System (RTOS), and the like.

The memory 386 may store various forms of application software, such as the maximum power point tracking (MPPT) module 389 and 390 (for providing independent MPPT as described below), the H-bridge switching module 392 (for controlling the switches Q1, Q2, Q3 and Q4 within the H-bridge 304), the cycloconverter switching module 396 (for controlling the switches Q5, Q6, Q7, Q8, Q9 and Q10 within the cycloconverter 310), and the control loop module

398 (for providing a feedback control loop as described below). The memory 386 may further store a database 399 for storing various data, such as data related to the present invention. The controller 306 further processes inputs and outputs to external communications 394 (e.g., a gateway) and a grid interface 388.

During operation of the inverter 302, the diagonals of the H-bridge 304 (i.e., the switches Q1/Q4 and Q2/Q3) are alternately activated and deactivated to generate a bipolar square wave output from the H-bridge 304. The average voltage at the midpoint of the H-bridge left leg (i.e., between the switches Q1 and Q2) is equal to the total inverter input voltage multiplied by $Q1_{ON}/(Q1_{ON}+Q2_{ON})$, where $Q1_{ON}$ and $Q2_{ON}$ are the ON-times for the switches Q1 and Q2, respectively, during a switching cycle. By adjusting the amount of ON-time apportioned to the switches Q1 and Q2 (and therefore the amount of ON-time apportioned to each diagonal) during a switching cycle, the average midpoint voltage of the H-bridge left leg can be biased to assume a desired voltage. For example, if the switch Q1 remains ON for half as long as the switch Q2 during each switching cycle, the average midpoint voltage of the H-bridge left leg would be biased at ⅓ of the total inverter input voltage. Alternatively, if the switch Q1 remains ON twice for twice as long as the switch Q2 during each switching cycle, the average midpoint voltage of the H-bridge left leg would be biased at ⅔ of the total inverter input voltage.

The action of the inductor L1 along with the capacitors Ca and Cb forms a filter which forces the voltage at the midpoint between the PV modules PVa and PVb to be equal to the average midpoint voltage of the H-bridge left leg, thereby driving the ratio of the PV module voltages Va/Vb to be equal to the ratio of the switch Q1 and the switch Q2 ON-times $Q2_{ON}/Q1_{ON}$ (assuming no losses). As such, by adjusting the relative ON-time ratio of the switches Q1 and Q2, the ratio of the input voltages from the PV modules PVa and PVb can be controlled. Such control can be used to provide independent maximum power point tracking (MPPT) for each of the PV modules PVa and PVb as described below.

Desired maximum power point (MPP) voltages $Va\text{-}_{MPP}$ and $Vb\text{-}_{MPP}$ (i.e., desired optimum operating point voltages) for the PV modules PVa and PVb, respectively, are independently determined by MPPT modules 389 and 390, respectively. The MPPT modules 389 and 390 may use any suitable MPPT algorithm, such as a "perturb and observe" algorithm, for determining the MPP voltages. The ratio of the MPP voltages—i.e., the ratio of the desired operating voltages for the PV modules PVa and PVb—can then be used to drive the relative ON-times of the switches Q1 and Q2 such that the PV modules PVa and PVb are biased at their respective MPP voltages.

In embodiments where it is assumed that no circuit losses occur, the relative ON-times for the switches Q1 and Q2 may be pre-computed (e.g., by the H-bridge switching module 392 of the controller 306) such that the ratio of the switch ON-times $Q2_{ON}/Q1_{ON}$ during each switching cycle is equal to the desired MPP voltage ratio $Va\text{-}_{MPP}/Vb\text{-}_{MPP}$ where $Va\text{-}_{MPP}$ is the set point for operating the PV module PVa at its MPP, and $Vb\text{-}_{MPP}$ is the set point for operating the PV module PVb at its MPP. For example, if the MPP voltages computed for the PV modules PVa and PVb are 30V and 32V, respectively, then $(Q2_{ON}/Q1_{ON})=30/32$ and the controller 104 drives the switches Q1, Q2, Q3 and Q4 within H-bridge 404 such that the switch Q1 (i.e., the H-bridge diagonal containing the switch Q1) is ON for 32 units of a switching cycle and the switch Q2 (i.e., the H-bridge diagonal containing the switch Q2) is ON for 30 units of the same switching cycle.

In other embodiments where circuit losses are assumed, the relative Q1 and Q2 ON-times may be dynamically adjusted as part of a feedback loop to drive the inverter input midpoint voltage (i.e., the voltage at the point between the PV modules PVa and PVb) to a desired set point based on the computed MPP. In such embodiments, the computed MPP voltages are input to a control loop (e.g., as represented by the control loop module 398). Based on the ratio $Va\text{-}_{MPP}/Vb\text{-}_{MPP}$, initial values for the relative ON-times of the switches Q1 and Q2 are determined and the H-bridge diagonals of the input bridge 304 are driven accordingly. The voltage monitor 312 measures the inverter input midpoint voltage (i.e. the voltage at the point between the PV modules PVa and PVb) and provides the measured voltage to the control loop. The control loop then adjusts the relative ON-times of the switches Q1 and Q2 to drive the inverter input midpoint voltage to the desired set point, where the set point is based on the two outputs from the individual MPPT algorithms (the ratio of the MPPT outputs would determine the desired set point voltages for PVa and PVb and hence the ratio of PVa to PVb would be the set point for determining the bridge midpoint voltage). The control loop may be a simple control loop, such as an integral feedback loop.

Figure 4:
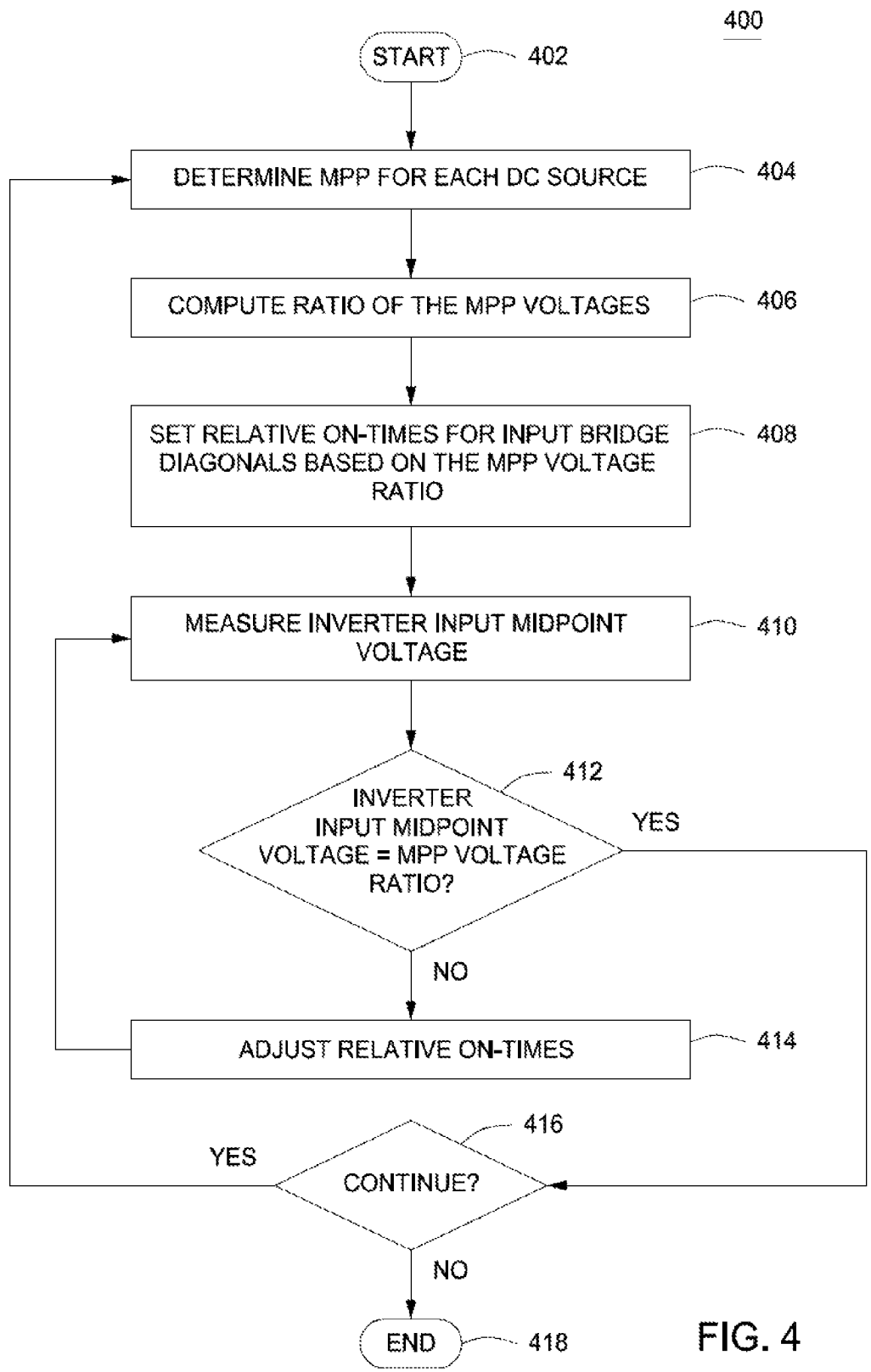
FIG. 4 is a flow diagram of a method for independent maximum power point (MPP) control for a multi-input power converter in accordance with another embodiment of the present invention.

FIG. 4 is a flow diagram of a method 400 for independent maximum power point (MPP) control for a multi-input power converter in accordance with one or more embodiments of the present invention. The method 400 is one implementation of the control loop module 398.

The multi-input power converter is a resonant power converter comprising a full H-bridge input bridge coupled across a bulk storage capacitor and also across two serially-coupled arc fault capacitors. The multi-input power converter is coupled to two serially-connected DC sources (i.e., one DC source is coupled across a first arc fault capacitor and one DC source is coupled across the second arc fault capacitor) for receiving DC power. In some embodiments the multi-input power converter is a DC-AC inverter (for example, the inverter 302) while in other embodiments the multi-input power converter is a DC-DC converter.

In some embodiments, such as the embodiments described below, the DC sources are photovoltaic (PV) modules, although in other embodiments the DC sources may be any suitable DC power source such as another type of renewable energy source, a battery, or the like. The method 400 provides independent control for biasing each of the serially-coupled DC sources at its individual MPP (or any desired set point).

The method 400 starts at step 402 and proceeds to step 404. At step 404, the MPP voltage (or alternatively any desired set point voltage) for each of the PV modules is determined. The MPP voltage (or any desired set point) may be independently determined for each of the PV modules by any suitable technique. In some embodiments, the MPPT modules 389 and 390 independently determine the MPP voltage for each of the PV modules and the control loop module 398 obtains the determined MPP voltages from the MPPT modules 389 and 390.

The method 400 proceeds to step 406 where the ratio of the MPP voltages is computed. At step 408, the relative ON-times for the input bridge diagonals during a switching period are set based on the ratio of the MPP voltages. As previously described, the relative ON-times for the diagonals are determined such that the ratio of the diagonal ON-times is equal to the ratio of the MPP voltages. The input bridge diagonals may then be driven (e.g., by the H-bridge switching module 492) using the determined relative ON-times.

At step 410 the inverter input midpoint voltage is measured, and at step 412 a determination is made whether the inverter input midpoint voltage is equal to the ratio of the MPP voltages computed at step 406. If the result of the determination is no, that the inverter input midpoint voltage is not equal to the computed ratio of the MPP voltages, the method 400 proceeds to step 414. At step 414, the relative ON-times for the input bridge diagonals are adjusted to drive the inverter input midpoint voltage to be equal to the computed ratio of the MPP voltages, and the method 400 returns to step 410. Generally, the input bridge diagonal ON-times are adjusted at a much slower frequency than the switching frequency until their ratio is equal to the computed MPP voltage ratio. In certain embodiments, the ratio of MPP voltages may be updated (e.g., periodically) based on a determined change in MPP voltage for one or both of the PV modules.

If, at step 412, it is determined that the inverter input midpoint voltage is equal to the computed ratio of the MPP voltages, the method 400 proceeds to step 416. At step 416 a determination is made whether to continue operation. If the result of the determination at step 416 is yes, the method 400 returns to step 404; if the result of the determination is no, the method 400 proceeds to step 418 where it ends.

In one or more alternative embodiments of the method 400, the input bridge diagonals continue to be operated based on the relative ON-times established at the step 408 and the method 400 proceeds directly from step 408 to step 416. For example, it may be assumed that there are no losses associated with the arc fault capacitors and the inductor, and thus the ratio of the diagonal ON-times can be assumed to be equal to the ratio of the MPP voltages and not require any further adjustment. Alternatively, losses that would be incurred may be calculated or estimated and used to accordingly adjust the relative ON-times for the diagonals.

Figure 5A:
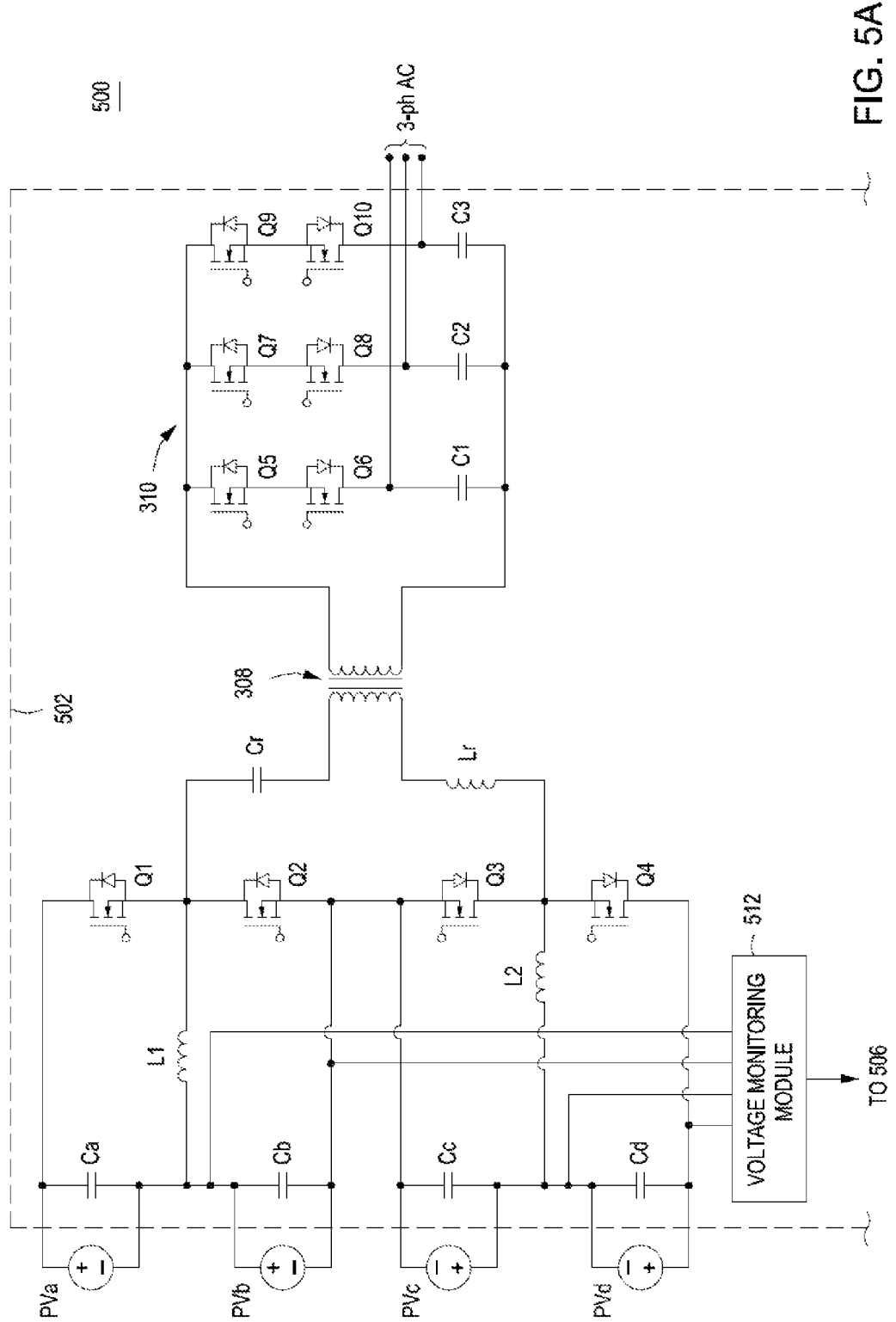
FIGS. 5a and 5b are a schematic diagram of a power conversion system comprising a quadruple input inverter in accordance with another embodiment of the present invention.
Figure 5B:
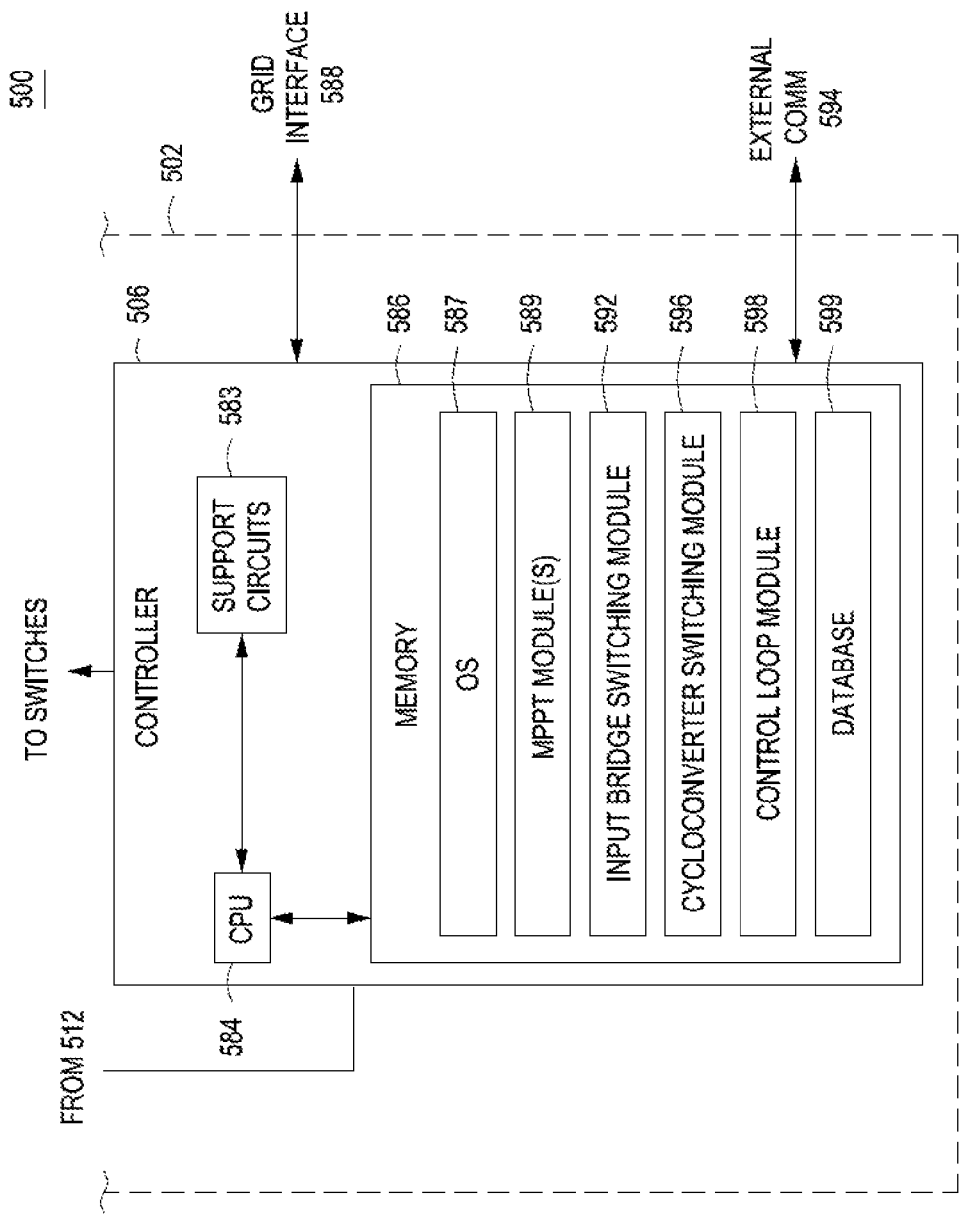

FIGS. 5a and 5b are a schematic diagram of a power conversion system 500 comprising a quadruple input inverter 502 in accordance with another embodiment of the present invention. The power conversion system 500 comprises PV modules PVa, PVb, PVc, and PVd coupled to an inverter 502, although in alternative embodiments other types of DC voltage sources, such as other types of renewable energy sources, may be additionally or alternatively be used. Although a three-phase AC output from the inverter 502 is depicted in FIGS. 5a and 5b, in other embodiments the inverter 502 may generate one or two of AC output, or alternatively DC output.

The inverter 502 comprises, as previously described with respect to FIG. 3, a series combination of the input capacitors Ca and Cb coupled across a series combination of the switches Q1 and Q2, with the inductor L1 having one terminal coupled between the capacitors Ca and Cb and a second terminal coupled between the switches Q1 and Q2. Also as previously described with respect to FIG. 3, the PV modules PVa and PVb are coupled across the capacitors Ca and Cb, respectively, thereby enabling independent control for each of the PV modules PVa and PVb as previously described with respect to FIGS. 3 and 4.

The inverter 502 further comprises a series combination of input capacitors Cc and Cd (analogous to the capacitors Ca and Cb) coupled across a series combination of the previously described switches Q3 and Q4, with an inductor L2 (analogous to the inductor L1) having one terminal coupled between the capacitors Cc and Cd and a second terminal coupled between the switches Q3 and Q4. The PV modules PVc and PVd are coupled across the capacitors Cc and Cd, respectively. Analogous to the PV modules PVa and PVb, the PV modules PVc and PVd can be independently controlled with respect to one another.

The switches Q2 and Q3 are coupled to one another at their source terminals to form two half-bridge circuits analogous to the topology described above with respect to FIG. 1, thereby enabling the PV modules PVa and PVb to be biased independent of the PV modules PVc and PVd. Accordingly, the four PV modules PVa, PVb, PVc and PVd can be independently controlled.

The inverter 502 further comprises a series combination of the capacitor Cr (previously described with respect to FIG. 3), the primary winding of the transformer 308 (also previously described with respect to FIG. 3), and an inductor Lr, where a terminal of the capacitor Cr is coupled between the switches Q1 and Q2, and a terminal of the inductor Lr is coupled between the switches Q3 and Q4. The secondary winding of the transformer 308 is coupled across the cycloconverter 310 (previously described with respect to FIG. 3). A voltage monitoring module 512 is coupled across the capacitor Cb and also across the capacitor Cd and provides corresponding voltage samples to a controller 506. The controller 506 is also coupled to each of the switches Q1-Q10 for operatively controlling the switches Q1-Q10. The inverter 502 may include additional circuitry not shown, such as voltage and/or current monitors, for obtaining data for use as described herein.

The controller 506, analogous to the controllers 182 and 306, comprises a CPU 584 coupled to each of support circuits 583 and a memory 586. The CPU 584 may comprise one or more conventionally available microprocessors or microcontrollers; additionally or alternatively, the CPU 584 may include one or more application specific integrated circuits (ASICs). The support circuits 583 are well known circuits used to promote functionality of the CPU 584. Such circuits include, but are not limited to, a cache, power supplies, clock circuits, buses, input/output (I/O) circuits, and the like. The controller 506 may be implemented using a general purpose computer that, when executing particular software, becomes a specific purpose computer for performing various embodiments of the present invention.

The memory 586 may comprise random access memory, read only memory, removable disk memory, flash memory, and various combinations of these types of memory. The memory 586 is sometimes referred to as main memory and may, in part, be used as cache memory or buffer memory. The memory 586 generally stores the operating system (OS) 587, if necessary, of the controller 506 that can be supported by the CPU capabilities. In some embodiments, the OS 587 may be one of a number of commercially available operating systems such as, but not limited to, LINUX, Real-Time Operating System (RTOS), and the like.

The memory 586 may store various forms of application software, such as one (or more) maximum power point tracking (MPPT) modules 589 for providing independent MPPT control as previously described with respect to FIGS. 1-4; an input bridge switching module 592 for controlling the switches Q1-Q4 as previously described with respect to the FIGS. 1-4; a cycloconverter switching module 596 for controlling the switches Q5-Q10 within the cycloconverter 310 as previously described with respect to the FIGS. 1-4; a control loop module 598 for providing one or more feedback control loops as previously described with respect to FIGS. 3 and 4; and a database 599 for storing various data, such as data related to the present invention. The controller 506 further processes inputs and outputs to external communications 594 (e.g., a gateway) and a grid interface 588.

The topology of the power conversion system 500 allows completely independent MPPT for all four PV modules by combining the dual input independent MPPT techniques described above with respect to FIGS. 1-4. Additionally, the capacitors Ca, Cb, Cc, and Cd coupled across PVa, PVb, PVc, and PVd, respectively, provide arc fault protection as previously described.

If the inverter 502 is sized for commercially available 72-cell, 6" PV modules and is provisioned to support reactive power to 0.9 pf, the design depicted in FIGS. 5a and 5b would be sized at 1.6 kVA.

Figure 6:
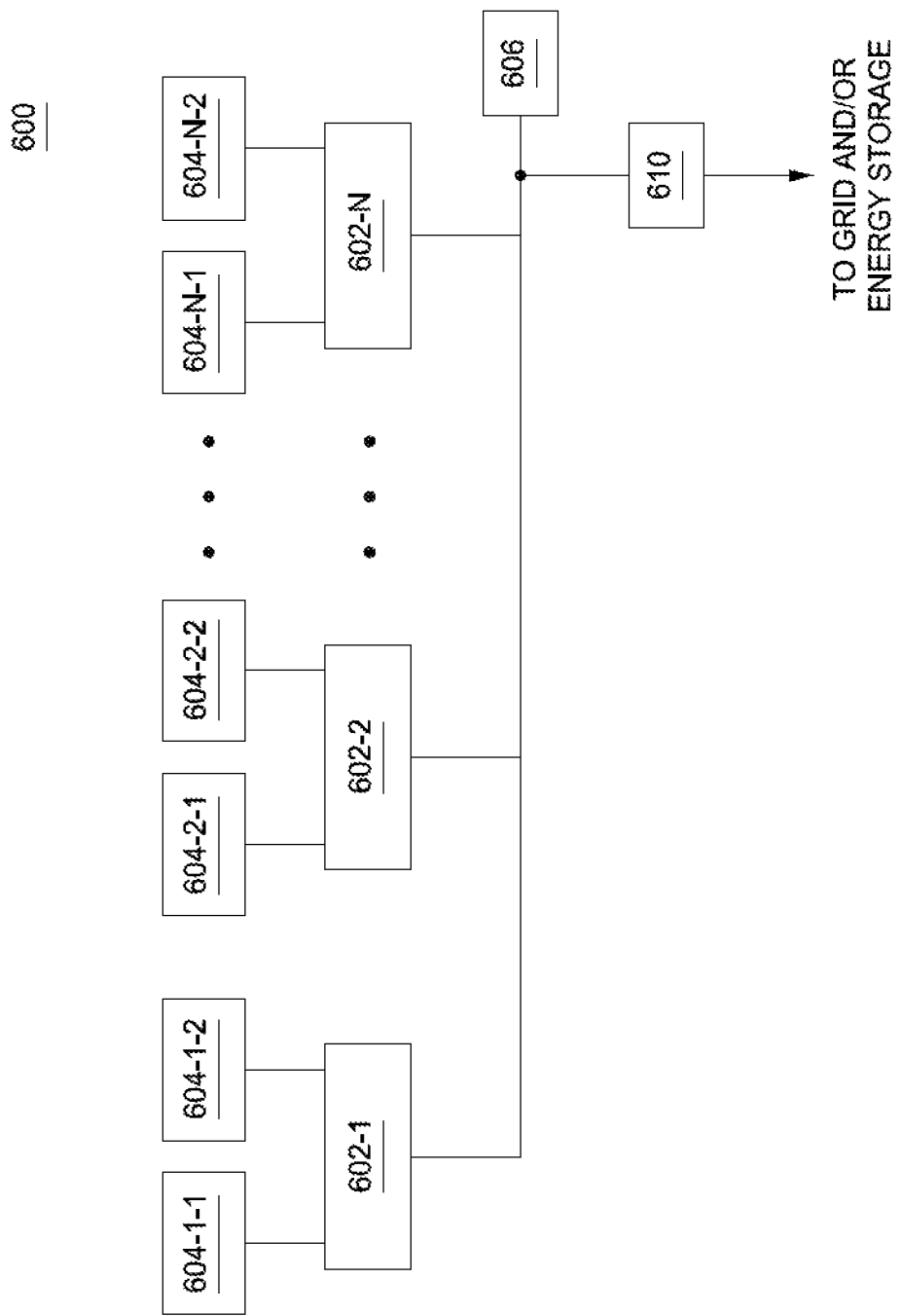
FIG. 6 is a block diagram of a system for power conversion comprising one or more embodiments of the present invention.

FIG. 6 is a block diagram of a system 600 for power conversion comprising one or more embodiments of the present invention. This diagram only portrays one variation of the myriad of possible system configurations and devices that may utilize the present invention. The present invention can be utilized in any system or device for independently controlling multiple power converter sources.

The system 600 comprises a plurality of power converters 602-1, 602-2 . . . 602-N, collectively referred to as power converters 602. Each power converter 602 is coupled to two DC sources 604—i.e., the power converter 602-1 is coupled to the DC sources 604-1-1 and 604-1-2; the power converter 602-2 is coupled to the DC sources 604-2-1 and 604-2-2; and the power converter 602-N is coupled to the DC sources 604-N-1 and 604-N-2. The DC sources 604 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

The power converters 602 are further coupled to a system controller 606 via an AC bus 608, and a load center 610 is also coupled to the AC bus 608. The system controller 606 is capable of communicating with the power converters 602 by wireless and/or wired communication (e.g., power line communications) for providing operative control of the power converters 602 and/or receiving data from the power converters 602. In some embodiments, the system controller 606 may be a gateway that receives data from the power converters 602 and communicates the data to another system, e.g., via the Internet.

The power converters 602 are each capable of converting the received DC power to AC power, although in other embodiments the power converters 602 may receive an AC input and convert the received input to a DC output. The power converters 602 couple the generated output power to the load center 610 via the bus 608. The generated power may then be distributed for use, for example to one or more appliances, and/or the generated energy may be stored for later use, for example using batteries, heated water, hydro pumping, $H_2O$-to-hydrogen conversion, or the like. In some embodiments, the power converters 602 convert the DC input power to AC power that is commercial power grid compliant and couple the AC power to the commercial power grid via the load center 610.

In some alternative embodiments, the power converters 602 may be DC-DC power converters; in other alternative embodiments, the power converters 602 may receive an AC input and be AC-AC converters (e.g., AC-AC matrix converters).

In certain embodiments, each power converter 602 is an embodiment of the power converter 100. In such embodiments, the corresponding DC power sources 604 are coupled to the power converter 602 as previously described with respect to the power converter 100, and the power converters 602 independently bias the corresponding DC power sources 604 as previously described with respect to FIGS. 1 and 2. In some such embodiments the power converters 602 may generate a three-phase AC output; in other embodiments the power converters 602 may generate a single-phase or two-phases of AC output power.

In other embodiments, each power converter 602 is an embodiment of the power converter 302. In such embodiments, the corresponding DC power sources 604 are coupled to the power converter 602 as previously described with respect to the power converter 302 (i.e., for each converter 602 the corresponding DC sources are serially coupled to one another), and the power converters 602 independently bias the corresponding DC power sources 604 as previously described with respect to FIGS. 3 and 4. In some such embodiments the power converters 602 may generate a three-phase AC output; in other embodiments the power converters 602 may generate a single-phase or two-phases of AC output power.

In still other embodiments, each power converter 602 is an embodiment of the power converter 502 and has additional DC sources 604 coupled to it. In such embodiments, each DC source 604 is independently controlled as previously described with respect to FIGS. 5a and 5b.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. A method for independently controlling multiple power converter sources, comprising:
determining, by a controller, a ratio of a first set point for biasing a first DC source to a power converter and a second set point for biasing a second DC source to the power converter, wherein the first and the second DC sources are serially-coupled to one another and coupled to an input bridge of the power converter by a filter; and
determining, by a controller and based on the ratio, relative switching times for driving a first diagonal of an input bridge of the power converter and a second diagonal of the input bridge to bias the first DC source proximate the first set point and the second DC source proximate the second set point.

2. The method of claim 1, wherein the first and the second set points are independently determined.

3. The method of claim 1, wherein a ratio of an ON-time for the first diagonal and an ON-time for the second diagonal is equal to the ratio of the first and the second set points.

4. The method of claim 1, further comprising:
comparing a value of an input midpoint voltage of the power converter to the ratio of the first and the second set points; and
adjusting, when the input midpoint voltage is not equal to the ratio, the relative switching times.

5. The method of claim 1, wherein the filter comprises (a) a first capacitor serially coupled to a second capacitor and (b) an inductor having a first terminal coupled between the first and the second capacitors, and wherein the first and the second capacitors are coupled across the first and the second DC sources, respectively, and wherein a second terminal of the inductor is coupled to a midpoint of a first leg of the input bridge.

6. The method of claim 1, wherein the first set point is a maximum power point (MPP) of the first DC source and the second set point is an MPP of the second DC source.

7. An apparatus for independently controlling multiple power converter sources, comprising:
a power converter comprising:
a plurality of inputs for coupling to a first DC source and a second DC source such that the first and the second DC sources are serially coupled to one another;
an input bridge;
a filter coupled to the first and the second DC sources and the input bridge; and
a controller for (i) determining a ratio of a first set point for biasing the first DC source and a second set point for biasing the second DC source to the power converter, and (ii) determining, based on the ratio of the first and the second set points, relative switching times for driving a first diagonal of the input bridge and a second diagonal of the input bridge to bias the first DC source proximate the first set point and the second DC source proximate the second set point.

8. The apparatus of claim 7, wherein the first and the second set points are independently determined.

9. The apparatus of claim 7, wherein a ratio of an ON-time for the first diagonal and an ON-time for the second diagonal is equal to the ratio of the first and the second set points.

10. The apparatus of claim 7, wherein the controller further (iii) compares a value of an input midpoint voltage of the power converter to the ratio of the first and the second set points, and (iv) adjusts, when the input midpoint voltage is not equal to the ratio, the relative switching times.

11. The apparatus of claim 7, wherein the filter comprises (a) a first capacitor serially coupled to a second capacitor and (b) an inductor having a first terminal coupled between the first and the second capacitors, and wherein the first and the second capacitors are coupled across the first and the second DC sources, respectively, and wherein a second terminal of the inductor is coupled to a midpoint of a first leg of the input bridge.

12. The apparatus of claim 7, wherein the first set point is a maximum power point (MPP) of the first DC source and the second set point is an MPP of the second DC source.

13. The apparatus of claim 7, wherein the power converter is a DC-AC inverter.

14. A system for power conversion, comprising:
a first DC source and a second DC source; and
a power converter, coupled to the first and the second DC sources, comprising:
a plurality of inputs for coupling to the first and the second DC sources such that the first and the second DC sources are serially coupled to one another;
an input bridge;
a filter coupled to the first and the second DC sources and the input bridge; and
a controller for (i) determining a ratio of a first set point for biasing the first DC source and a second set point for biasing the second DC source to the power converter, and (ii) determining, based on the ratio of the first and the second set points, relative switching times for driving a first diagonal of the input bridge and a second diagonal of the input bridge to bias the first DC source proximate the first set point and the second DC source proximate the second set point.

15. The system of claim 14, wherein the first and the second set points are independently determined.

16. The system of claim 14, wherein a ratio of an ON-time for the first diagonal and an ON-time for the second diagonal is equal to the ratio of the first and the second set points.

17. The system of claim 14, wherein the controller further (iii) compares a value of an input midpoint voltage of the power converter to the ratio of the first and the second set points, and (iv) adjusts, when the input midpoint voltage is not equal to the ratio, the relative switching times.

18. The system of claim 14, wherein the filter comprises (a) a first capacitor serially coupled to a second capacitor and (b) an inductor having a first terminal coupled between the first and the second capacitors, and wherein the first and the second capacitors are coupled across the first and the second DC sources, respectively, and wherein a second terminal of the inductor is coupled to a midpoint of a first leg of the input bridge.

19. The system of claim 14, wherein the first set point is a maximum power point (MPP) of the first DC source and the second set point is an MPP of the second DC source.

20. The system of claim 14, wherein the power converter is a DC-AC inverter and the first and the second DC sources are photovoltaic (PV) modules.

* * * * *